Figure 3:
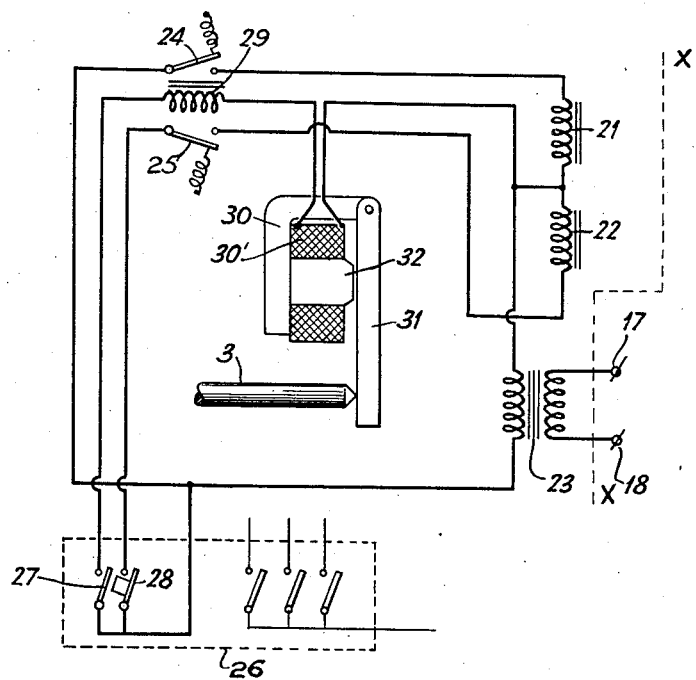

April 4, 1944.        J. A. VAN LAMMEREN ET AL        2,345,778
REMOTE MOTOR CONTROL
Filed March 15, 1941        2 Sheets-Sheet 1
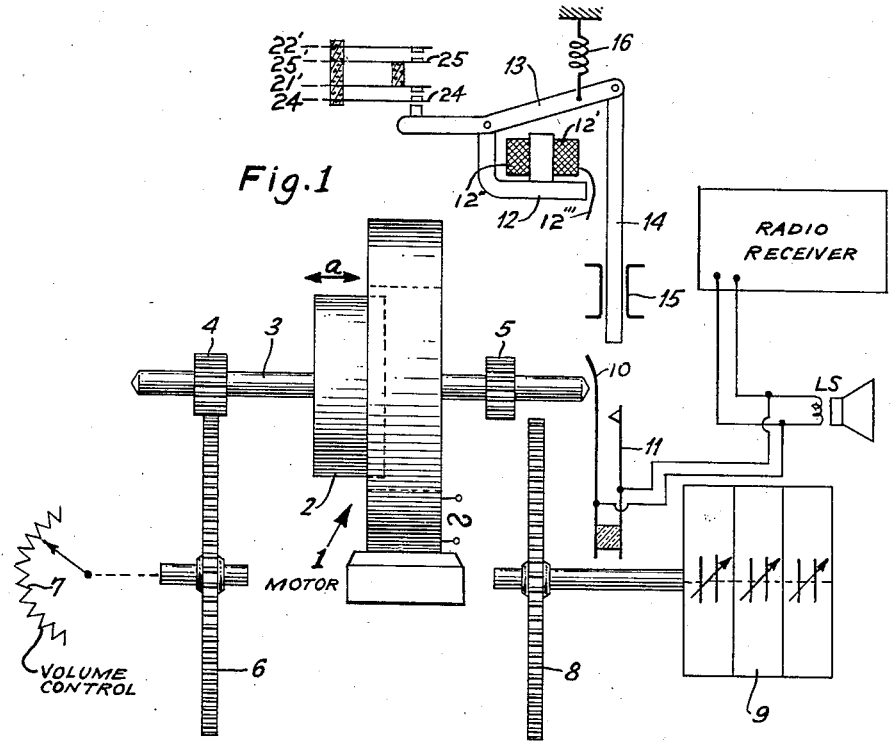
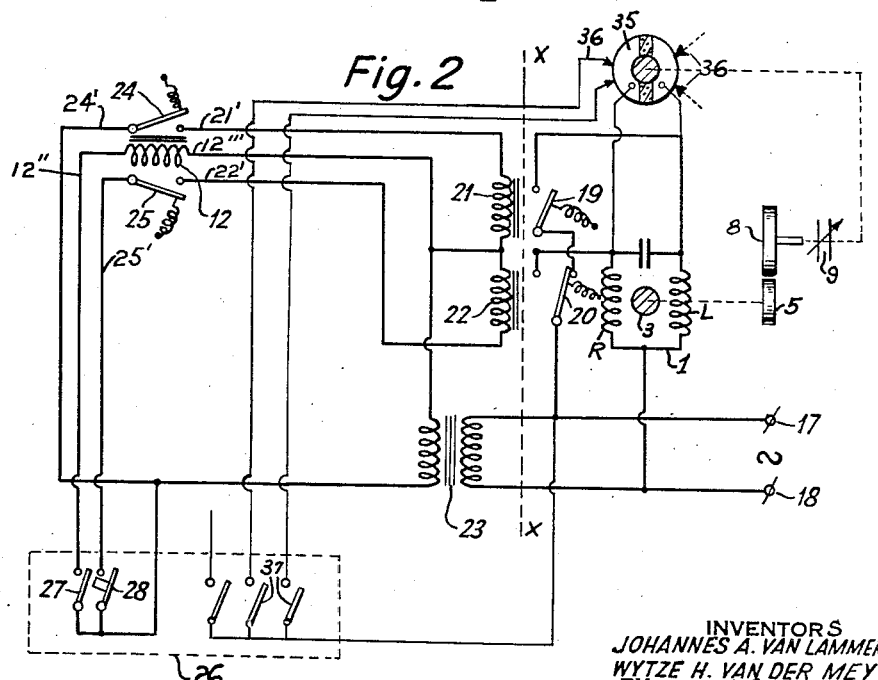
INVENTORS
JOHANNES A. VAN LAMMEREN
WYTZE H. VAN DER MEY
BY
ATTORNEY April 4, 1944.　　J. A. VAN LAMMEREN ET AL　　2,345,778
REMOTE MOTOR CONTROL
Filed March 15, 1941　　2 Sheets-Sheet 2

INVENTORS
JOHANNES A. VAN LAMMEREN
WYTZE H. VAN DER MEY
BY
ATTORNEY

Patented Apr. 4, 1944

2,345,778

UNITED STATES PATENT OFFICE 2,345,778

REMOTE MOTOR CONTROL

Johannes Antonius van Lammeren and Wÿtze Hendrik van der Mey, Eindhoven, Netherlands; vested in the Alien Property Custodian Application March 15, 1941, Serial No. 383,524
In the Netherlands September 13, 1939

8 Claims. (Cl. 172—239)

This invention relates to a radio-receiver comprising a motor having an axially movable shaft for performing more than one control function.

Radio receivers which can be tuned by means of push buttons may be devised in such manner that after depression of a push button the tuning means are brought into the position corresponding to the desired station by means of a motor. The use of a motor for operating the tuning means is particularly advisable when the receiver is to be tuned at a distance.

In the last-mentioned case it is advisable that additional control functions such as, for instance, the choice of the wave range, volume control, adjustment of the band-width and so on should be performed by means of a motor. For the additional functions it has already been proposed, as in the Manson et al. Patent No. 1,926,393, to incorporate one or more separate motors in the receiver. However, this is an expensive solution which, moreover, requires much space in the receiver.

Again it is known to use one motor for more than one control function. The receiver, for instance, may be devised so that the motor operates the tuning means in one direction of rotation and the wave-range switch in the other direction of rotation as disclosed and claimed in our Patent No. 2,312,035, issued on February 23, 1943.

It has already been suggested to utilize the axial displacement of the motor-shaft for increasing the number of control functions to be fulfilled. When the motor is normally energized the shaft is shifted until the armature extends in the field. Thus a mechanical coupling with the tuning means is established. If, on the other hand the motor is energized by a weaker current the shaft is not shifted or to an insufficient degree so that the motor may actuate a potentiometer for volume control. However, this has the drawback that the motor can develop only a small torque and it is not very sure that the shaft will not shift or only to a slight extent.

To avoid these drawbacks displacement of the shaft during the performance of one control function is rendered impossible prior to putting the motor into circuit for the performance of another control function.

The invention will be more clearly understood by reference to the accompanying drawings, wherein Fig. 1 shows in diagrammatic fashion one form of construction which embodies the present invention, Fig. 2 shows the electrical circuit utilized in the system of Fig. 1, and Fig. 3 is a modified form of circuit which may be used in place of that shown in Fig. 2.

In Figure 1 the reference number 1 denotes an electric motor whose armature 2 is mounted on a shaft 3 which is movable in an axial direction, indicated by the double arrow a. The shaft 3 has mounted on it two pinions 4 and 5. In the position of shaft 3 illustrated in the drawings the pinion 4 meshes with a toothed wheel 6 secured on the shaft of a potentiometer 7. The potentiometer 7 serves to control the sound strength or volume of the radio receiver. When the shaft 3 is shifted to the right the engagement is interrupted and pinion 5 meshes with a toothed wheel 8 secured on the shaft of the diagrammatically represented tuning means 9. When the motor is not energized the shaft is kept in the represented position by a leaf spring 10 which together with leaf spring 11 constitutes a contact which is closed when the shaft 3 is shifted to the right. In the illustrated position the armature 2 partly extends beyond the field of the stator. Upon energization the armature is completely drawn into the field of the stator so that the coupling between toothed wheels 4 and 6 is interrupted and a coupling is established between toothed wheels 5 and 8. At the same time the spring contact 10—11 is closed. This contact is, for instance, connected in parallel with the loudspeaker LS of the receiver so that the loudspeaker is short-circuited during control of the tuning means.

If, however, displacement of the motor shaft 3 is prevented during energization of the motor, the latter on being put into circuit drives the potentiometer 7 for volume control instead of the tuning means 9.

For blocking the motor shaft there is provided a relay 12 having an exciting coil 12' and a pivoted armature 13 to one end of which is secured a plunger bar 14 which is movable along a straight guide 15. Normally the armature 13 assumes the raised position shown in the drawings by action of the spring 16. Upon energization of the relay 12 the bar 14 is moved downwardly in the path of the motor shaft so that the latter is prevented from moving to the right. Consequently the relay 12 must be energized before putting the motor 1 into circuit. To this end the relay 12 operates several spring contacts 24, 25 by which energization of the motor is initiated. This will now be explained in connection with the circuit of Fig. 2.

The motor 1 which is of the reversible type and is provided with the field windings R and L is fed from power mains connected between the terminals 17 and 18. Associated with the motor field windings are two spring biased armatures 19 and 20 controlled by relays 21 and 22 respectively. In the position shown in the drawings the two relays 21 and 22 are not energized and the motor circuit is interrupted. When solely the relay 21 is energized, its armature 19 is closed and the motor operates, for instance, in a left-hand direction, since only the motor field winding L is energized. When, on the contrary, both relays 21 and 22 are energized the armatures 19 and 20 are operated, and as a result of which the motor operates, for instance, in a right-hand direction, since then only the motor field winding R is energized. Energization of the relays 21 and 22 is effected through the intermediary of a transformer 23 which is also fed from the power mains connected between terminals 17 and 18. This transformer serves at the same time to energize through a manually controlled contact device 27 the relay 12 which corresponds to the relay 12 shown in Figure 1. This relay 12 includes, moreover, two spring biased contacts 24 and 25 which are operated to circuit closing position upon energization of the relay 12.

A box 26 for remote control comprises two contacts 27 and 28 for controlling the sound strength. To obtain a stronger sound solely the contact 27 is closed by means of a push-button bearing the inscription "louder," whereas for obtaining a weaker sound both contacts 27 and 28 must be closed by means of another push-button bearing the inscription "softer."

Closure of only contact 27 results in the relay 12 being energized by transformer 23. Due to this, the bar 14 is forced down into the path of the motor-shaft as a result of which the shaft is prevented from moving to the right. However, due to the fact that the armature 2 extends partly in the field of the stator the motor remains coupled through gears 4 and 6 to the potentiometer for volume control. At the same time due to the energization of 12 spring contacts 24 and 25 are closed. Only the relay 21 will now be energized through spring contact 24 and contact 27 (contact 28 being open) so that the motor resumes its action in a left-hand direction and the sound strength is increased. Closure of contact 27 and in addition contact 28 causes also the relay 22 to be energized through spring contact 25 and contact 28 and as a result of which the motor resumes its action in a right-hand direction thus reducing the sound strength.

Figure 3 represents another embodiment of the invention.

The circuit shown in Figure 3 substantially corresponds to that shown in Figure 2. For simplicity the motor 1 and its connections appearing to the right of the line x—x in Figure 2 is omitted from Figure 3.

In Figure 3 the relay exciting coil 12' shown in Figure 2 is replaced by two series-connected relay exciting coils 29 and 30'. Coil 29 exclusively operates both spring contacts 24 and 25, whereas the coil 30' of the relay 30 exclusively serves to prevent displacement of the motor shaft 3.

For this purpose the relay 30 is equipped with an armature 31 loosely engaging the core 32 so that the magnetic circuit of the relay 30 is closed over a very narrow air gap. The armature 31 engages the motor shaft 3.

When the relay 30 is not energized and the motor is put into circuit, for instance, by auxiliary means for operating the tuning means, the armature 31 is pushed away by the moving motor shaft 3. When, in contradistinction thereto the relay 30 is energized, such as is the case when the motor controls the potentiometer for controlling the sound strength, the armature 31 is drawn with a great force against the core 32, since the air-gap is very narrow. The motor shaft cannot surmount this force and is consequently prevented from being displaced.

For the automatic control of the receiver tuning means any suitable known arrangement may be utilized, as for example, that shown in Patent No. 2,204,065, issued on June 11, 1940, to Beizer et al. As diagrammatically shown in Fig. 2, the arrangement comprises a two-part reversing commutator 35, a plurality of adjustable station selecting contacts 36, and a plurality of manually operated contact keys 37. Since such motor-operative automatic tuner and its mode of operation are well known in the art, further description thereof is believed unnecessary.

What we claim is:

1. In radio apparatus, the combination with tuning and volume control devices therefor, of a motor having a shaft for actuating said devices, said shaft being axially movable and having two positions of operation, one for actuating one of said devices and a second position for actuating the other of said devices, a first means upon actuation thereof for energizing the circuit of the motor, electro-mechanical means operative upon said energization of the motor circuit to restrain the motor shaft in one of its two positions whereby the motor actuates the one said device, and a second independent means upon actuation thereof for energizing the motor and for simultaneously shifting the shaft to its second position whereby the motor actuates the said other device.

2. In radio apparatus, the combination with tuning and volume control devices therefor, of a motor having a shaft for actuating said devices, said shaft being axially movable and having two positions of operation, one for actuating one of said devices and a second position for actuating the other of said devices, a first means upon actuation thereof for energizing the circuit of the motor, a relay included in the motor circuit and operative upon energization of said circuit to hold the motor shaft at one of its two positions whereby the motor actuates the one said device, and a second independent means upon actuation thereof for energizing the motor exclusive of the relay and for simultaneously shifting the shaft to its second position whereby the motor actuates the said other device.

3. In radio apparatus, the combination with tuning and volume control devices therefor, of a reversible motor having a shaft for selectively actuating said devices, said shaft being axially shiftable to two positions of operation, one for actuating one of said devices and a second position for actuating the other of said devices, a pair of relay-operated switches for determining the direction of rotation of the motor, a control circuit including a relay provided with a pair of normally open switches and a stop member, manual means for energizing the control circuit to so operate the direction determining relays to control the direction of motor rotation and to hold by means of the stop member the motor shaft at one of its two positions whereby the motor actuates the one said device, and a second means exclusive of the pair of relay-operated switches for energizing the motor and for simultaneously shifting the shaft to its second position whereby the motor actuates the said other device.

4. In radio apparatus of the type provided with a tuning device and a volume control device, control mechanism therefor comprising a single reversible motor and a shaft actuated thereby, said shaft having a normal position and being axially shiftable to a second position of operation, said shaft in the normal position controlling one of said devices and in the second position controlling the other of said devices, first means under control of manually operated keys at a remote point for energizing the circuit of the motor, means operative upon said energization of the motor circuit to hold the motor shaft at its normal position whereby the motor actuates the one said device, and second means independent of the motor shaft holding means for energizing the motor and for simultaneously shifting the shaft to its second position whereby the motor actuates the said other device.

5. In radio apparatus, the combination with a pair of devices to be adjusted, of a motor having a shaft for actuating said devices, said shaft being axially movable and having two positions of operation, one for actuating one of said devices and a second position for actuating the other of said devices, means for energizing the circuit of the motor, and electro-mechanical means operative upon said energization of the motor circuit to restrain the motor shaft in one of its two positions whereby the motor actuates the one said device.

6. In radio apparatus, the combination with a pair of control devices therefor to be adjusted, of a motor having a shaft for actuating said devices, said shaft being axially movable and having two positions of operation, one for actuating one of said devices and a second position for actuating the other of said devices, means for energizing the circuit of the motor, a stop member, and a relay for actuating the stop member included in the motor circuit and operative upon energization of said circuit to cause the stop member to hold the motor shaft at one of its two positions whereby the motor actuates the one said device.

7. In radio apparatus, the combination with a pair of control devices therefor to be adjusted, of a reversible motor having a shaft for selectively actuating said devices, said shaft being axially shiftable to two positions of operation, one for actuating one of said devices and a second position for actuating the other of said devices, a pair of relay-operated switches for determining the direction of rotation of the motor, a control circuit including a relay provided with a pair of normally open switches and a stop member, and manual means for energizing the control circuit to so operate the direction determining relays to control the direction of motor rotation and to hold by means of the stop member the motor shaft at one of its two positions whereby the motor actuates the one said device.

8. In radio apparatus of the type provided with a tuning device and a volume control device, control mechanism therefor comprising a single reversible motor and a shaft actuated thereby, said shaft having a normal position and being axially shiftable to a second position of operation, said shaft in the normal position controlling one of said devices and in the second position controlling the other of said devices, means under control of manually operated keys at a remote point for energizing the circuit of the motor, and means operative upon said energization of the motor circuit to hold the motor shaft at its normal position whereby the motor actuates the one said device.

JOHANNES ANTONIUS van LAMMEREN.
WYTZE HENDRIK van der MEY.